United States Patent [19]

Chittor

[11] Patent Number: 5,592,610
[45] Date of Patent: Jan. 7, 1997

[54] METHOD AND APPARATUS FOR ENHANCING THE FAULT-TOLERANCE OF A NETWORK

[75] Inventor: Suresh S. Chittor, Beaverton, Oreg.

[73] Assignee: Intel Corporation, Santa Clara, Calif.

[21] Appl. No.: 363,353

[22] Filed: Dec. 21, 1994

[51] Int. Cl.$^6$ .................................................. G06F 11/34
[52] U.S. Cl. ............................... 395/182.02; 395/183.19
[58] Field of Search .......................... 395/183.19, 182.02, 395/183.17, 183.2, 185.04, 180, 181, 182.01, 183.19; 370/85.14, 85.13, 85.4, 60, 94.1, 94.3; 364/268.9

[56] References Cited

U.S. PATENT DOCUMENTS

| | | | |
|---|---|---|---|
| 5,008,882 | 4/1991 | Peterson et al. | 370/94.1 |
| 5,058,105 | 10/1991 | Mansour et al. | 370/16 |
| 5,105,424 | 4/1992 | Flaig et al. | 370/94.1 |
| 5,138,615 | 8/1992 | Lamport et al. | 370/94.3 |
| 5,151,900 | 9/1992 | Snyder et al. | 370/94.3 |
| 5,218,676 | 6/1993 | Ben-Ayed et al. | 395/275 |

OTHER PUBLICATIONS

M. Sultan Alam, et al. "Routing In Modular Fault Tolerant Multiprocessor Systems", 22nd Annual Intl. Symp. on Fault-tolerant Computing, pp. 185–193, 1992.

R. V. Bopanna, et al., "New Wormhole Routing Algorithms for Multicomputers", International Parallel Processing Symposium, pp. 419–423, 1993.

S. Borkar, et al., "iWarp: An Integrated Solution To High-speed Parallel Computing", Supercomputing '88, pp. 330–339, 1988.

J. Bruck, et al., "Efficient Fault–Tolerant Mesh and Hypercube Architectures", International Symposium on Fault-tolerant Computing, pp. 162–169, 1992.

S. Chalsani, et al., "Fault–tolerant Routing in MIN–based Supercomputers", Supercomputing, pp. 244–253, 1990.

M. S. Chen, et al., "Depth–first Search Approach For Fault–tolerant Routing In Hypercube Multicomputers", IEEE Trans. on Parallel and Distributed Systems, pp. 152–159, Apr. 1990.

A. A. Chien, et al., "Planar–adaptive Routing: Low–cost Adaptive Networks For Multiprocessors", Proc 19th Annual International Symposium on Computer Architecture, pp. 268–277, 1992.

L. Ciminiera, et al., "A Connecting Network With Fault Tolerance Capabilities", IEEE Transactions on Computers, pp. 578–580, Jun. 1986.

W. Dally, et al., "Adaptive Routing using Virtual Channels", Laboratory for Computer Science Massachusetts Institute of Technology, pp. 1–24, Jul. 1990.

W. Dally, et al., "Deadlock–free Adaptive Routing In Multicomputer Networks Using Virtual Channels", IEEE Trans. on Parallel and Distributed Computing, pp. 466–475, Apr. 1993.

(List continued on next page.)

Primary Examiner—Robert W. Beausoliel, Jr.
Assistant Examiner—Albert Décady
Attorney, Agent, or Firm—Blakely, Sokoloff Taylor & Zafman

[57] ABSTRACT

A method and apparatus for enhancing the fault-tolerance of a network finds a set of computing nodes within the network which are available for use in the network upon detection of a faulty component. This set of available computing nodes is found by first determining a set of computing nodes within the network which are physically connected together. A connectivity value for each computing node within this set is then determined. A subset of this set is then generated such that each computing node in the subset is able to transfer data to and from each other computing node in the subset. This subset is then utilized as the set of available computing nodes. In one embodiment, the set of computing nodes which are physically connected together is the largest set of physically connected computing nodes in the system.

24 Claims, 7 Drawing Sheets

OTHER PUBLICATIONS

W. Dally, et al., "Deadlock–Free Message Routing in Multiprocessor Interconnection Networks", IEEE Transactions on Computers, pp. 547–553, May 1987.

W. Dally, "Performance Analysis of k–ary n–cube Interconnection Networks", IEEE Transactions on Computers, pp. 775–785, Jun. 1990.

W. Dally, et al., "The torus routing chip", Distributed Computing, pp. 187–196, 1986.

W. Dally, "Virtual Channel Flow Control", IEEE Trans. on Parallel and Distributed Systems, pp. 194–205, 1990.

Abdel Aziz Farrag, "Tolerating A Faulty Edge In A Multi–Dimensional Mesh", International Phoenix Conference on Computers and Communications, pp. 9–15, 1993.

S. A. Felperin, et al., "Routing Techniques For Massively Parallel Communications", proceedings of the IEEE, pp. 488–503, 1991.

Tse–yun Feng, "A Survey of Interconnection Networks", Computer, pp. 5–20, 1981.

P. T. Gaughan, et al., "Pipelined Circuit–switching: A Fault–tolerant Variant of Wormhole Routing", Proc Fourth IEEE Symposium on Parallel and Distributed Processing, pp. 148–155/92.

C. J. Glass, et al., "Fault–tolerant Wormhole Routing In Meshes", 23rd Annual International Symposium on Fault–Tolerant Computing, pp. 240–249, 1993.

C. J. Glass, et al., "The Turn Model For Adaptive Routing", Proc 19th Annual Int. Symposium on Computer Architecture, pp. 278–287, 1992.

J. Gordon, et al., "Hypercube Message Routing In The Presence of Faults", 3rd Hypercube Computers Conference, pp. 318–327, 1988.

R. E. Johnson, et al, "Interconnect Topologies with Point–to–Point Rings", Computer Science Department University of Wisconsin–Madison, pp. 1–30 and A1–A6, Dec. 1991.

J. Kim, et al., "Deadlock–free Fault–tolerant Routing In Injured Hypercubes", IEEE Trans. on Computers, pp. 1078–1088, Sep. 1993.

S., Latifi, et al, "Optimal Ring Embedding In Hypercubes With Faulty Links", 22nd Annual Intl. Symp. on Fault–tolerant Computing, pp. 178–184, 1992.

T. Lee, et al., "A Fault–tolerant Communication Scheme for Hypercube Computers", IEEE Trans. on Computers, pp. 1242–1256, Oct. 1992.

X. Lin, et al., "Deadlock–Free Multicast Wormhole Routing in Multicomputer Networks", Department of Computer Science Michigan State University, pp. 1–24, Oct. 1990.

X. Lin, et al., "Performance Evaluation of Multicast Wormhole Routing in 2D–Mesh Multicomputers", 1991 International Conference on Parallel Processing, pp. 1–435–1–442, 1991.

D. H. Linder, et al., "An Adaptive and Fault Tolerant Wormhole Routing Strategy For k–ary n–cubes", IEEE Trans on Computers, pp. 2–12, 1991.

K. Padmanabhan, et al., "A Class of Redundant Path Multistage Interconnection Networks", IEEE Trans. on Computers, pp. 1099–1108, Dec. 1983.

M. Peercy, et al., "Distributed Algorithms for Shortest–Path, Deadlock–free Routing and Broadcasting In Arbitrarily Faulty Hypercubes", 20th Ann. Intl. Symp. on Fault–tolerant computing, pp. 218–225, 1990.

C. S. Raghavendra, et al., "Free Dimensions—An Effective Approach To Achieving Fault Tolerance In Hypercubes", 22nd Annual Intl. Symp. on Fault–tolerant Computing, pp. 170–177/92.

D. A. Reed, et al., "Interconnection Networks", IEEE Computer, pp. 63–73, Jun. 1987.

A. Varma, et al., "Fault–tolerant routing in Multistate Interconnection Networks", IEEE Transactions on Computers, pp. 385–393, Mar. 1989.

C. S., Yang, et al., "A Reconfigurable Modular Fault–tolerant Binary Tree Architecture", International Phoenix Conference on Computers and Communications, pp. 37–41, 1993.

J. T. Yantchev, et al., "Adaptive, Low–latency Deadlock–free Packet Routing For Networks of Processors", IEEE proceedings, pp. 178–186, May 1989.

METHOD AND APPARATUS FOR ENHANCING THE FAULT-TOLERANCE OF A NETWORK

BACKGROUND OF THE INVENTION

1. Field of the Invention

The present invention pertains to computer networks. More particularly, this invention relates to improving the ability of a network to route around faulty components.

2. Background

Modern computer technology is advancing at a very fast rate and has resulted in high-performance computing components being made available in smaller and smaller packages. These small, high-performance components are finding expanded uses in a wide range of personal, business and academic fields.

One use of these high-performance components is in network systems. In a network system, multiple processing units are coupled together to perform various programmed tasks. For example, the processing units may be networked together as a local area network (LAN) in an office building to allow individuals with personal computer systems in the building to communicate with one another. Such network systems are beneficial to users because they allow the users to communicate with each other, such as by electronic mail or transferring data files between one another. Or, by way of another example, a "supercomputer" may contain multiple processing units which are coupled together via a high-performance network and which operate together to perform various programmed tasks. These supercomputers are beneficial to users because they provide an extremely fast, powerful and cost-effective system to carry out users' requests.

However, one disadvantage of network systems is that the greater the number of components in the system, the greater the chances that a component will become faulty during system operation. A network with thousands of components has a relatively low mean time between failure for the system components. That is, there is a relatively high probability that one component within the network will fail within a given period of time (for example, one failure per week). In order to be useful to the user(s), the network should be able to resolve these component failures. A system which shuts itself down upon detecting a faulty component and cannot re-start until the component is repaired or replaced reduces the availability of the system and increases the inconvenience to the users. Thus, it would be beneficial to provide a system which is able to automatically bypass faulty network components.

Furthermore, many users have neither the expertise nor the desire to resolve a component failure in the network by indicating to the network how to route around the faulty component. Many users do not have the technical expertise required to perform such a correction. Furthermore, performing such a correction could be very time-consuming, and distracts the user from his or her other responsibilities. Thus, it would be beneficial to provide a system which resolves the failure of a component in a manner which is transparent to the system user(s).

In addition, depending on the layout of a network, a faulty component could cut off multiple good components from the remainder of the network. Depending on the type of network, this could mean that some personal computers could not communicate with others, or that certain processing units would not be available to the system user, even though they are in good working condition. Thus, it would be beneficial to provide a system which reduces the number of good components which are disconnected from the remainder of the system by a faulty component.

Additionally, network systems should effectively resolve "deadlock" situations. A deadlock situation occurs when one or more components within the network cannot advance in their operation due to resources within the system which the component(s) requires being unavailable. The occurrence of a deadlock situation is dependent on the routing technique utilized in the system. In one routing technique, referred to as "circuit switching," a source node sends control information for a packet through its intended path to a destination node in the network to reserve each link in the path. Once the entire path is reserved, the source node transfers the data along the reserved path to the destination node. In another routing technique, referred to as "wormhole routing," the source node sends the necessary control information through its intended path to the destination node, followed immediately by the data. That is, the source node does not wait for the entire path to be reserved prior to beginning transfer of the data. In both of these routing techniques, the data packet maintains reservation of portions of the path already reserved while waiting for subsequent portions to be reserved. Thus, a deadlock situation may arise when, for example, two or more source nodes are attempting to transfer data to one or more destination nodes and none can advance because the other is blocking a portion of the data path required by the other. Thus, in order to provide continued performance of a network system, such deadlock issues need to be resolved.

The present invention provides for these and other advantageous results.

SUMMARY OF THE INVENTION

A method and apparatus for enhancing the fault-tolerance of a network is described herein. The present invention finds a set of computing nodes within the network which are available for use in the network upon detection of a faulty component. The present invention finds this set of available computing nodes by first determining a set of computing nodes within the network which are physically connected together. The present invention then determines a connectivity value for each computing node within this set. A subset of this set is then generated such that each computing node in the subset is able to transfer data to and from each other computing node in the subset. This subset is then utilized as the set of available computing nodes. In one embodiment, the set of computing nodes which are physically connected together is the largest set of physically connected computing nodes in the system.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1A:
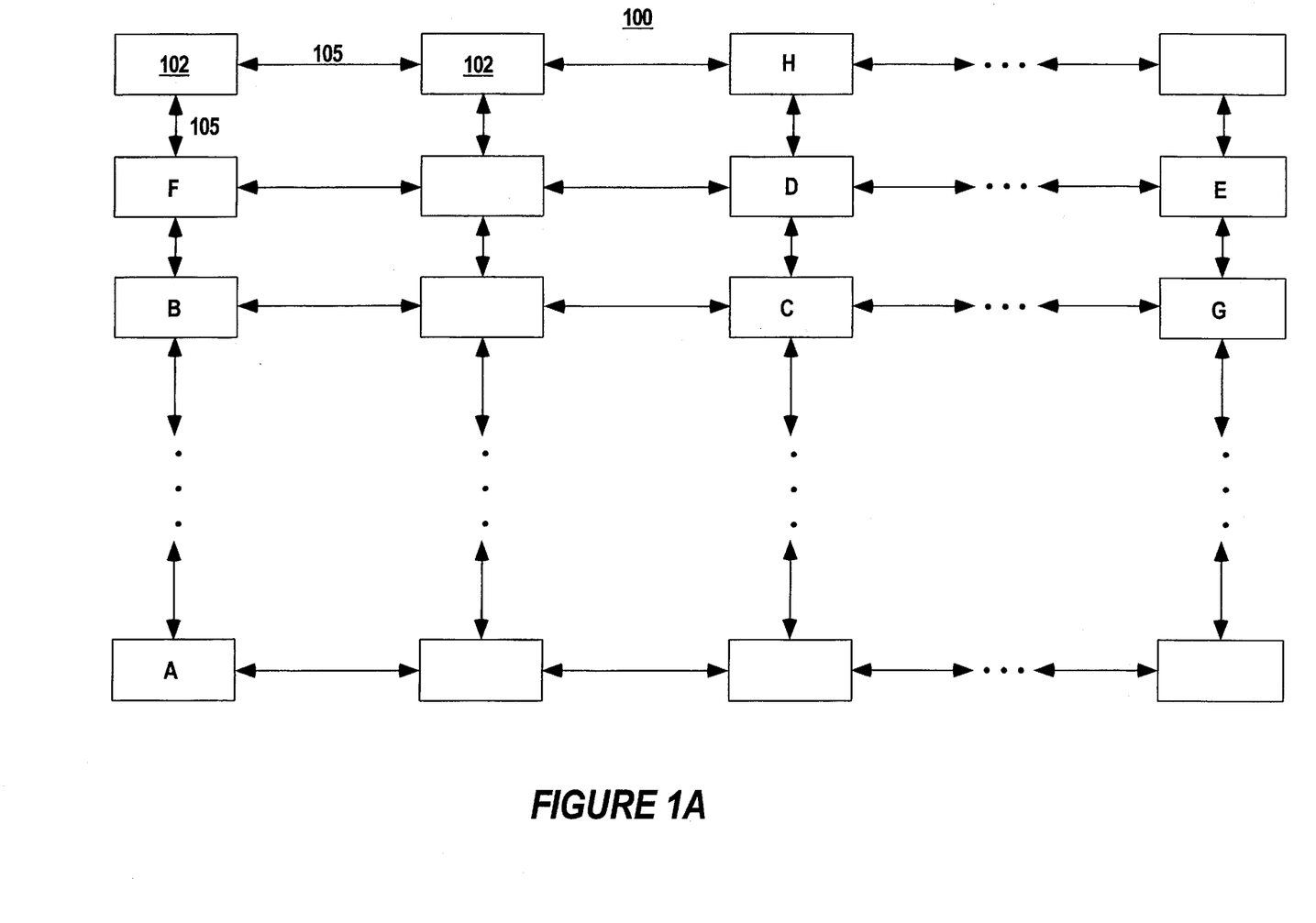
FIG. 1A is a network system according to one embodiment of the present invention.

FIG. 1A shows a network system according to one embodiment of the present invention. A two-dimensional mesh network 100 is shown including multiple routing devices 102, also referred to as routers. Each router 102 is coupled to the two, three, or four routers adjacent to the router in the matrix, depending on its location in the matrix as shown. A network 100 may have any number of routing devices. In one embodiment, network 100 includes 16 such routing devices organized in a four-by-four grid, creating a 4-ary 2-dimensional network.

Each router 102 is coupled to its adjacent routers 102 via a bi-directional communication link 105. Communication link 105 can be any of a wide variety of conventional communication devices. In one embodiment, communication link 105 is a set of wires or other signal transmission medium via which signals issued by a source router propagate to a destination router.

Figure 1B:
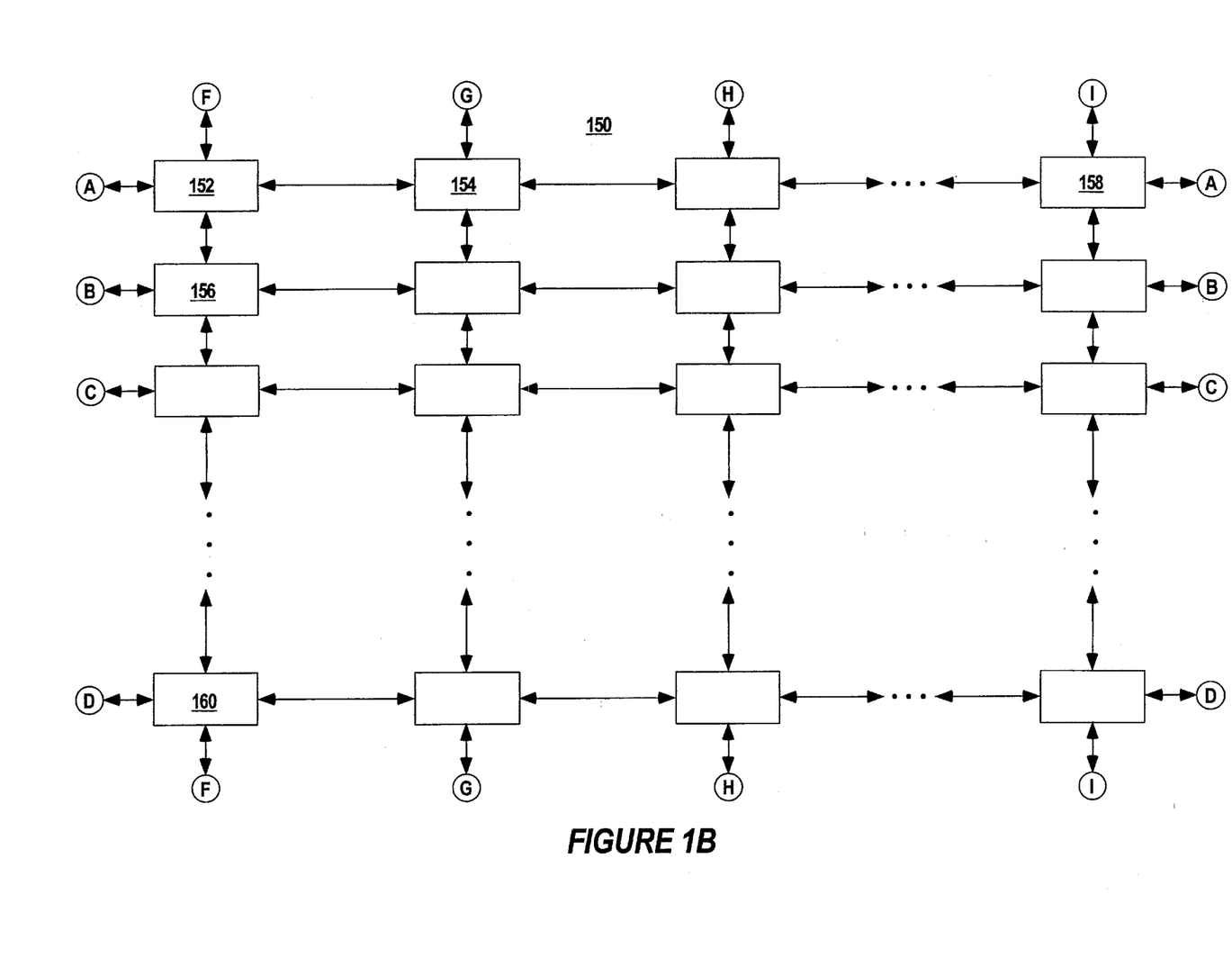
FIG. 1B is a network system according to an alternate embodiment of the present invention.

It should be noted that the present invention is not limited to two-dimensional mesh networks as shown FIG. 1A. Routers may be coupled together in a k-ary n-dimensional network, where k and n are any number greater than or equal to one. For example, a three-dimensional mesh-based network may be utilized in which each router is coupled to three, four, five or six other routers, depending on their location within the network. Alternatively, the routers may be connected in a torus network 150, as shown in FIG. 1B. In a torus network, the routers on the ends of the network are directly coupled to the routers on the opposing ends of the network; thus, each router is directly coupled to four other routers. For example, router 152 is directly coupled to routers 154, 156, 158 and 160. In an alternate embodiment, the routers may be connected in a partial torus network, such that the routers on only two of the ends of the network are directly coupled together, thereby resulting in each router being directly coupled to three or four other routers depending on its location within the network.

Furthermore, it will be appreciated that the network systems shown in FIGS. 1A and 1B represent a wide variety of computer networks. For example, the network could be a mesh-based interprocessor communication network utilized to couple computing nodes together in a supercomputer. Alternatively, the network could be a LAN which couples multiple personal computers together, such as multiple file or video servers.

Figure 2:
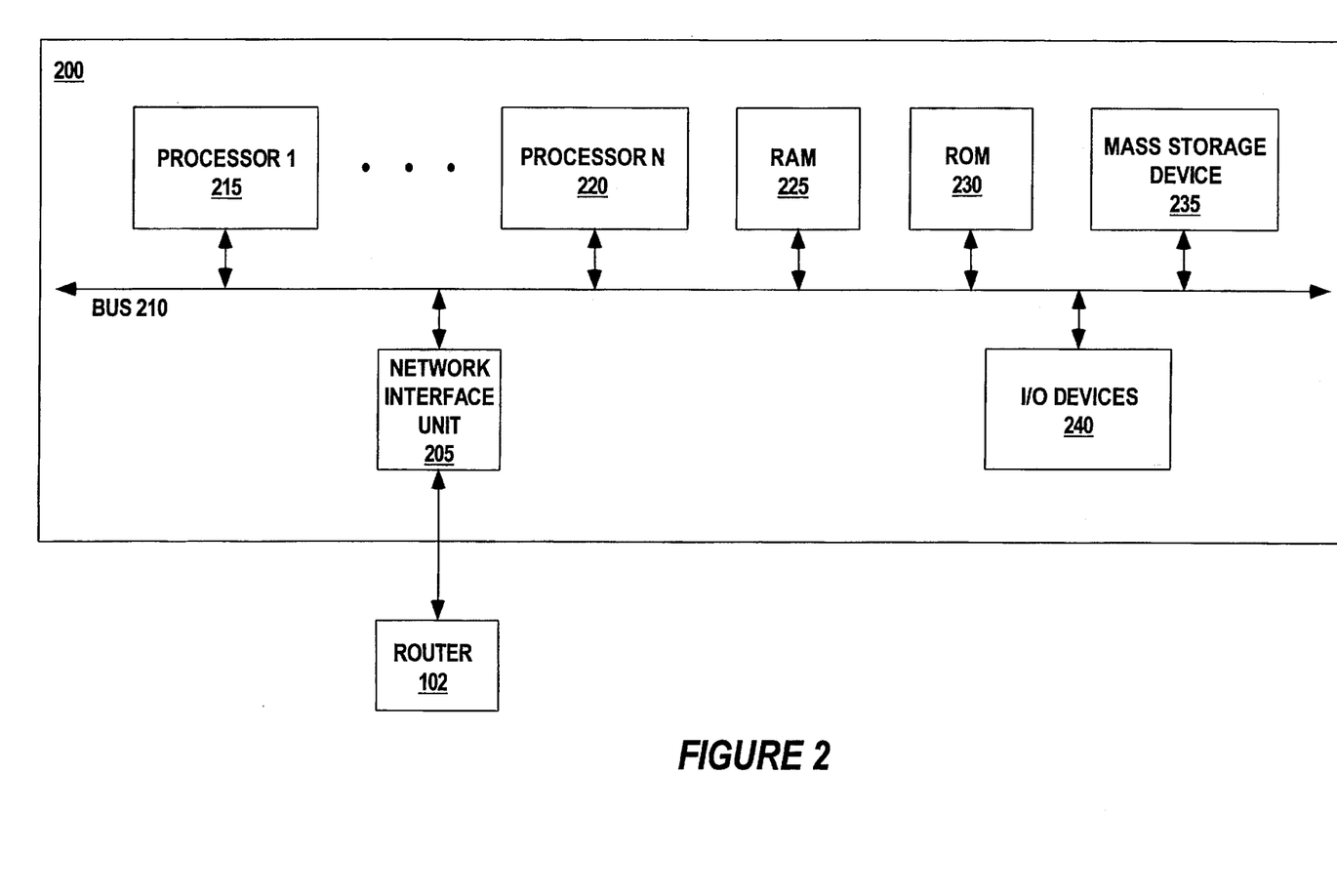
FIG. 2 shows a router coupled to a computing node according to one embodiment of the present invention.

In one embodiment of the present invention, each router 102 is coupled to a computing node 200 as shown in FIG. 2. A computing node 200 is shown comprising a bus or other communication device 210 for communicating information between one or more processors 215 and 220 for processing information and instructions. In one implementation, the present invention includes Intel® architecture microprocessors as processors 215 and 220; however, the present invention may utilize any type of microprocessor architecture. In one embodiment, bus 210 includes address, data and control buses. The system also includes random access memory (RAM) 225 coupled with bus 210 for storing information and instructions for the processors 215 and 220, a read only memory (ROM) 230 coupled with the bus 210 for storing static information and instructions for the processors 215 and 220, mass storage device 235 such as a magnetic or optical disk and disk drive coupled with the bus 210 for storing information and instructions, and input/output (I/O) devices 240 coupled with the bus 210 which input and output data and control information to and from the processors 215 and 220. I/O devices 240 include, for example, a display device, an alphanumeric input device including alphanumeric and function keys, and a cursor control device. A hard copy device such as a plotter or printer may also be included in I/O devices 240 for providing a visual representation of computer images.

A network interface unit 205 is also coupled with the bus 210 for allowing the node 200 to communicate with the router 102. In an alternate embodiment, network interface unit 205 is coupled to a separate I/O bus, such as a Peripheral Component Interconnect (PCI) bus, which is coupled to bus 21 0 via a bus bridge. In another alternate embodiment, network interface unit 205 is included as part of I/O devices 240. The network interface unit 205 operates in a conventional manner to transfer information to and from a router 102.

In one embodiment, the method of the present invention is implemented as a series of software routines that are run by the processors 215 and 220 of the computing nodes in the system. These software routines interact with the network to establish paths around faulty components. It will be appreciated by those skilled in the art, however, that in an alternative embodiment, the present invention may be implemented in discrete hardware or firmware.

It will be appreciated that certain implementations of the present invention may include additional processors or other components. Furthermore, certain implementations of the present invention may not require nor include all of the above components. For example, processor 220 or a display device may not be coupled to bus 210.

Returning to FIG. 1A, the present invention routes packets of data from source nodes to destination nodes in the network 100 utilizing "custom routing". A packet of data, as referred to herein, is the data which is being transferred from the source node to the destination node. Each packet may be of any size, typically ranging from a few bytes to several megabytes. In custom routing, the source node determines which path through the network 100 to utilize for transferring packets of data to a particular destination node. The path of a packet of data refers to the routers and links the packet travels through between the source and destination nodes. The path of the packet consists of one or more pathway segments. For example, assuming every router in FIG. 1A is coupled to a computing node, a path in the network of FIG. 1A exists where node A is the source node transferring information to the destination node E. The path node A selects includes pathway segments between node A and node B, node B and node C, node C and node D, and node D and node E.

Figure 3:
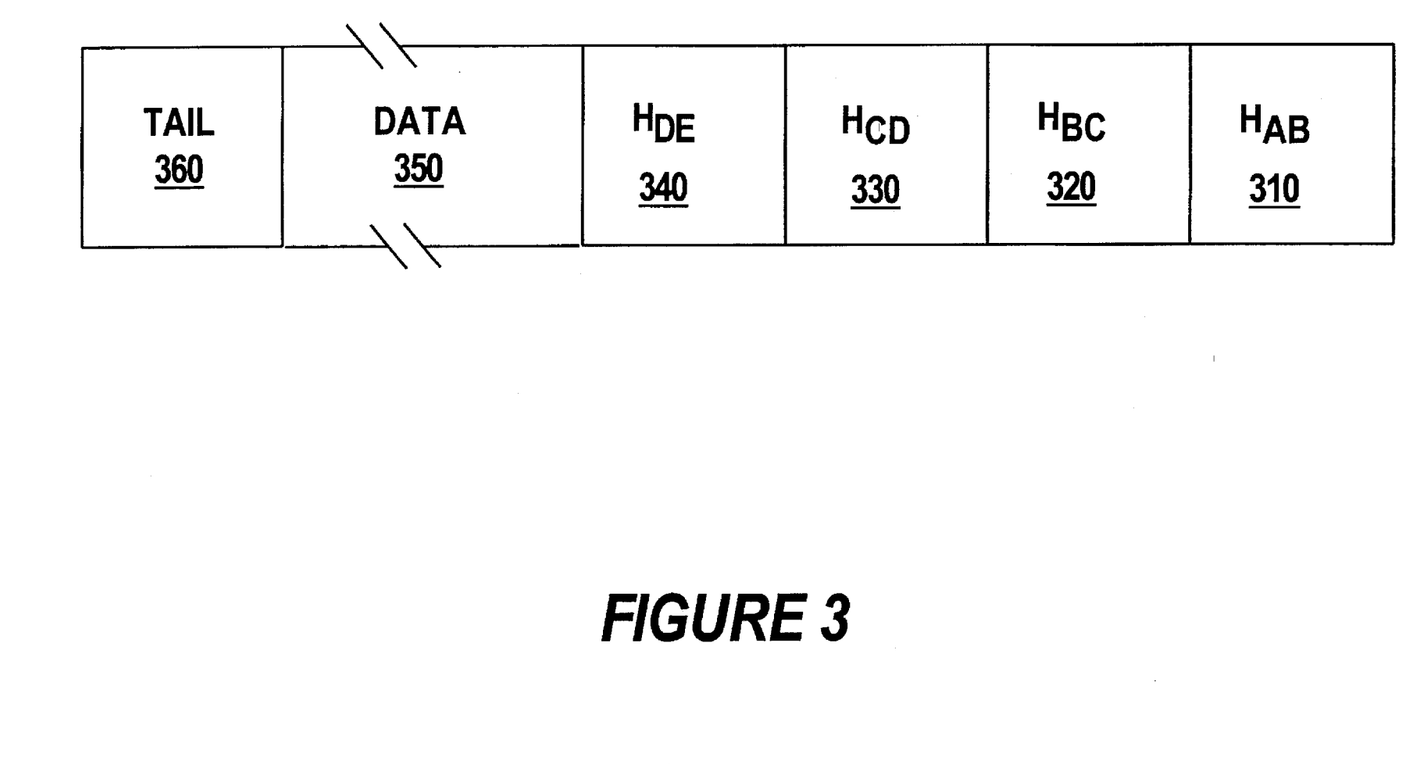
FIG. 3 shows a packet of data according to one embodiment of the present invention.

In one embodiment of the present invention, custom routing is implemented utilizing multiple header blocks as shown in FIG. 3. In this embodiment, each router in the network is assigned an identifier, such as a unique identification number. The packet 300 is generated by the source node and includes multiple header blocks which contain the necessary control information to indicate to the routers the path of the packet through network 100. The packet 300 shown includes four header blocks 310, 320, 330 and 340. Header block 310 is the first header block and indicates that the source node is the computing node coupled to router A and the first pathway segment is from router A to router B. The subsequent header blocks 320, 330 and 340 indicate pathway segments from router B to router C, router C to router D, and router D to router E, respectively. It should be noted that the header blocks in packet 300 indicate where the path through network 100 should begin, end, and the destination routers for pathway segments. For example, in FIG. 1A additional routers may exist between routers A, B, C, D and E. However, since those additional routers are not indicated as destination routers, the path of the packet continues in the same direction at these additional routers.

The header blocks 310–340 contain control information which indicate the proper path through the network 100. Following the header blocks 310–340, the packet 300 includes the data 350 and the tail 360. The data, as discussed above, can be bytes or megabytes. The tail 360 indicates the end of packet 300. Packets of data are transferred through the network 100 in units referred to as "flits". In one implementation of the present invention, each flit is 64 bits; however, a flit could contain any number of bits. In one embodiment of the present invention, each one of the links 105 shown in FIG. 1A is a 16-bit bus or other communication means. In an alternate embodiment, each one of the links 105 is capable of transferring an entire flit between two routers concurrently. For example, if a flit is 64 bits then each one of the links is a 64-bit bus or other communication means. In one embodiment of the present invention, each one of the header blocks 310–340 and the tail 360 is a single flit. The data portion 350 typically comprises multiple flits and may comprise any number of flits. In one implementation, data portion 350 typically comprises 4 k bytes, or 512 64-bit flits. In an alternate implementation, data portion 350 typically comprises four bytes, or four 64-bit flits.

In one embodiment of the present invention, custom routing is implemented using a "wormhole routing" technique. In wormhole routing, when a packet of data begins transfer along a path, each portion of the path it begins on is reserved for that packet until the packet tail 360 is received. That is, when router A begins the transfer to router B, router A determines whether the link between router A and the next router is available. If the link is not available, then the router A waits to begin transmission of the packet until the link is available. Once the link is available, router A transfers the first flit, header block 310, from router A to the next router. Note that this next router may be router B, or may be an additional router between router A and router B. Router A then holds that portion of the path to the next router for this packet of data and continues to transfer subsequent data in the packet to the next router until the tail 360 is transferred. It should be noted, however, that other packets may also be transferred over this same physical link utilizing "virtual channels," as discussed in more detail below.

Each time a router receives data for a new packet, the router checks whether the next link in the path is available, and begins transfer along that link once it is available. The proper link to transfer the data to is indicated in the header blocks. In one implementation, when a router receives a new header block it checks whether it is the destination router for that block. If it is not the destination router, then the router transfers the header block and all subsequent flits in the packet in the same direction within the network. However, if the router is the destination router indicated by the first header block, it discards the first header block and checks the subsequent flit (that is, the second header block) to determine the next pathway segment. Once it determines the next pathway segment, the router transfers the second header block and all subsequent flits to the next router in the path.

Once the destination node is reached, the first flit received by the destination router is the last header block. The second flit received by the destination router is the first flit of data 350. In one implementation, this first flit of data 350 is a flit of control information indicating it is the first flit of data. Alternatively, the destination router could know the flit is data and not a header block because the control information included within each header block is not contained within the data flit, or the last header block may contain control information indicating it is the last header block. Thus, the destination router knows that the computing node coupled to the router is the proper destination for the subsequent flits, and transfers the subsequent flits in the packet to the computing node rather than to another router.

Figure 4:
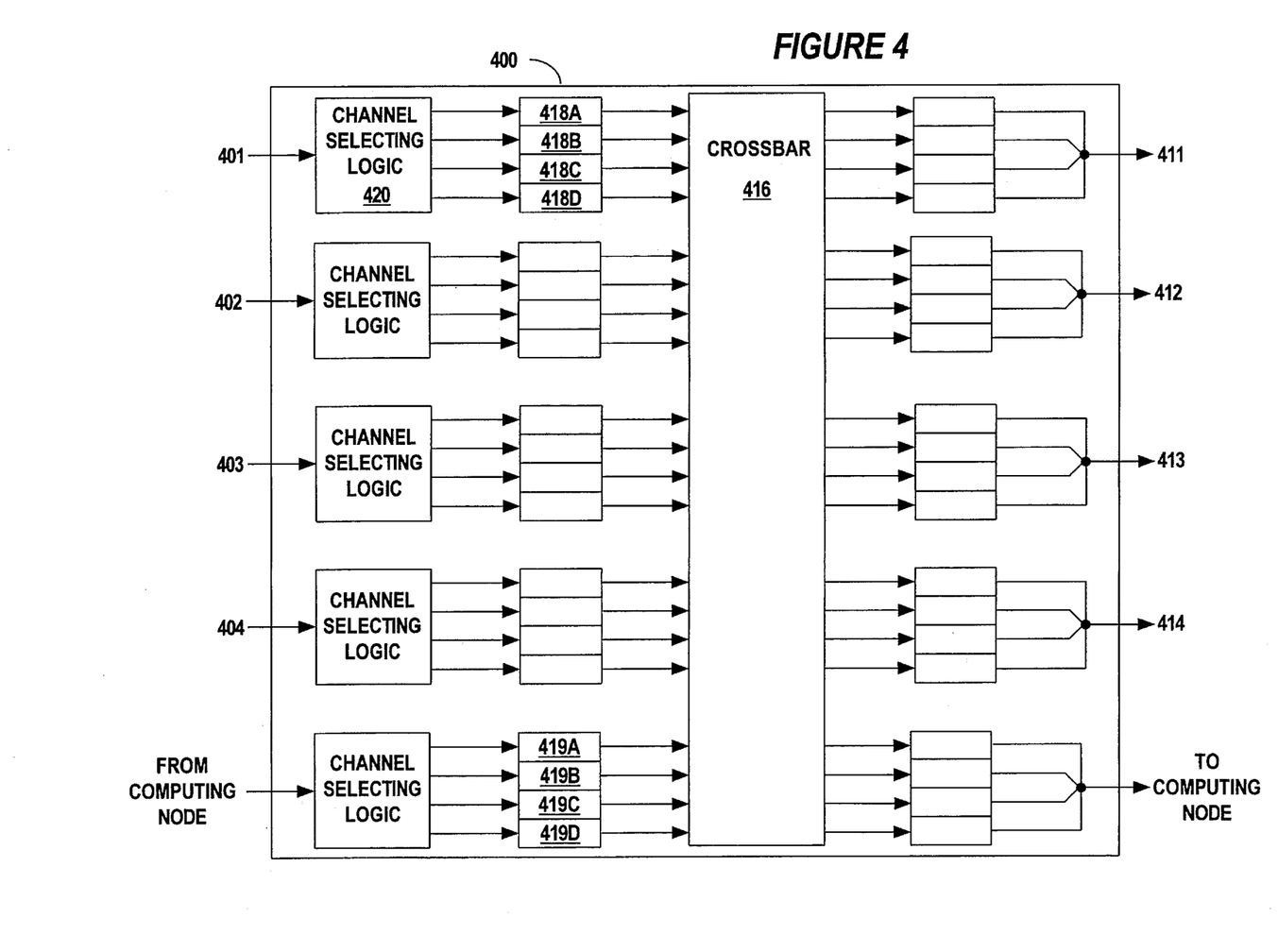
FIG. 4 shows a routing device according to one embodiment of the present invention.

FIG. 4 shows a routing device according to one embodiment of the present invention in more detail. The router 400 has four input links 401, 402, 403 and 404, and four output links 411, 412, 413 and 414. Each of the four input links and the four output links represent one of the links 105 shown in FIG. 1A. Thus, the router 400 shown in FIG. 4 is coupled to four other routers 102 of FIG. 1A. The router 400 also includes a crossbar 41 6 which transfers data received on an input link 401, 402, 403 or 404 to the appropriate output link 411, 412, 413 or 414. It will be appreciated that the number of input links and output links which are directly coupled to a router is dependent on the topology of the network and that router's location in the network, as shown in FIGS. 1A and 1B.

Each of the four input links 401–404 is coupled to four different inbound queues 418a, 418b, 418c and 418d. The inbound queues 418a–418d are temporary storage facilities in router 400 for incoming data. In one embodiment of the present invention, each one of the inbound queues 418a–418d is a 16-flit first in-first out (FIFO) buffer. Therefore, each of the inbound queues 418a–418d can be smaller than the size of a packet being routed through the network.

Each one of the queues 418a–418d represents a different "virtual channel" of the router. That is, even though the router 400 is coupled to only the single input link 401, router 400 can temporarily store data before passing it on to the next router via one of the output links 411–414. Thus, even though a single physical network exists, the router 400 is able to temporarily store data from four separate packets. Thus, router 400 supports four "virtual channels," because the router is able to support four separate data paths utilizing its temporary storage capabilities. Each one of these four virtual channels corresponds to one of the inbound queues 418a–418d.

In one embodiment of the present invention, these virtual channels are configured as static virtual networks. A static virtual network is a network in which paths between source and destination nodes utilize the same numbered virtual channels. For example, if two virtual networks are supported by the system, then a path between source and destination nodes is entirely in the first network or entirely in the second network (however, note that two separate paths, one in each virtual network, could exist). Thus, packets which router 400 receives on a particular virtual network and transfers to input queue 418a (for example, virtual channel A) will be transferred to virtual channel A in each of the other routers in the system which receive the packet.

In an alternate embodiment of the present invention, static virtual networks are not required. For example, a particular source node may indicate that the path to a destination node should utilize a first virtual channel for the first pathway segment and a second virtual channel for the second pathway segment. In this embodiment, the channel selecting logic 420 checks the control information in the header blocks received and transfers the subsequent flits of the packet to the channel indicated by the header block. Note that in this embodiment the router 400 also checks whether the second virtual channel of the next link is available (for example, another packet may currently be utilizing the second network).

Each node within the network system is able to utilize any one of these four virtual networks. Which virtual network a source node utilizes to transfer data to a destination node is dependent on several factors, including the existence of a deadlock-free path within the virtual network as discussed in more detail below. In the example shown, four virtual networks are supported. It will be appreciated however, that any number of virtual networks can be supported by router 400 by utilizing the proper number of input queues 418.

Data is received by router 400 in flits, as discussed above. Upon receipt of a flit of a new packet via input link 401, a channel selecting logic 420 coupled to input link 401 checks the control information in the flit. In one embodiment of the present invention, the first flit of a new packet is a header block. If the header block indicates that the current router is not the destination router for the pathway segment, then the channel selecting logic 420 checks the control information in the header block to determine which virtual network the packet is using. The channel selecting logic 420 then transfers the first flit and all subsequent flits in the packet to the channel of input link 401 corresponding to the virtual network and asserts a request signal to an arbitration unit to transfer the flits of the packet to the output link continuing in the same direction through the network.

However, if the header block indicates that the current router is the destination router for this pathway segment, then channel selecting logic 420 discards the first header block and checks the second flit. If the second flit is a header block, then channel selecting logic 420 checks the control information in the header block to determine which of the virtual networks the packet is using. The channel selecting logic 420 then transfers the second and all subsequent flits in the packet to the channel of input link 401 corresponding to that virtual network and asserts a request signal to the arbitration unit to transfer the flits of the packet to the output link indicated by the header block. The channel selecting logic 420 continues to transfer all subsequent flits to this channel until the tail of the packet is received. If, however, the second flit is not a header block, then the packet is transferred to the computing node connected to the router 400, as discussed in more detail below.

In one embodiment of the present invention, channel selecting logic 420 stores the directions of the input links 401–404 and the output links 411–414. Channel selecting logic 420 utilizes these directions when router 400 is not a destination router for the packet. In this situation, router 400 transfers the packet to the next router along the same direction in the network as the previous link. Channel selecting logic 420 is able to determine which output link 411–414 is in the same direction based on these stored directions.

Data received by router 400 via input links 402–404 is handled analogously to the discussion above regarding input link 401.

In one embodiment of the present invention, router 400 includes an additional set of inbound queues 419a–419d which are coupled directly to the computing node connected to router 400. These inbound queues 419a–419d are used analogous to inbound queues 418a–418d discussed above, except that the source of the packets transferred to inbound queues 419a–419d is the computing node rather than another routing device. Thus, when the computing node connected to the routing device is the source node for a particular packet, the flits of that packet are transferred from the computing node to the inbound queues 419a–419d and channel selecting logic coupled to the inbound queues 419a–419d asserts a request signal to the arbitration unit to transfer the flits of the packet to the appropriate outbound link, as indicated by the header information for the packet.

Crossbar 416 transfers flits from the four input links 401–404 to the four output links 411–414. The channels of each of the four input links 401–404 are multiplexed onto the output links 411–414 by crossbar 416. In one embodiment of the present invention, router 400 operates according to an arbitration policy which ensures that the data being received on each input link 401–404 is treated fairly. In one implementation, this arbitration policy is the well-known round-robin scheme. By ensuring that each input link is treated fairly, packets being transferred on multiple virtual networks progress through the network independent of the progress of packets on any other virtual network. Alternatively, other arbitration policies may be employed which are less fair, such as giving one or more channels priority over the remaining channels. However, these other arbitration policies should be such that the progress of packets on one virtual network does not prevent the progress of packets on another virtual network indefinitely.

In one embodiment of the present invention, channel selecting logic 420 maintains the current state for each channel of the four input channels. That is, channel selecting logic 420 keeps track of whether a packet is currently being transferred via a particular channel and the correct outbound link for a packet if a packet is being transferred. In this embodiment, crossbar 416 is a coupling device which connects each input queue of each input link to each outbound channel of each output link. When a new packet is received by channel selecting logic 420, it asserts an access request signal to an arbitration unit for access to the appropriate output channel. If another input link is currently using the requested output channel then the request is denied. Once the output channel is available, the arbitration unit asserts an access granted signal to channel selecting logic 420. Channel selecting logic 420 does not begin transfer of the data to the output link until this access granted signal is received. Thus, conflicts between multiple input links for the same output channel are resolved by the arbitration unit granting access to the output channel to only one input link at a time. Note that if only a single channel has data to be transferred, the crossbar 416 allows that channel to monopolize the crossbar 416 until another channel has data to be transferred. The arbitration unit grants access to the output channels according to the arbitration policy utilized by the router, as discussed above.

It will be appreciated that other implementations of an arbitration unit may also be utilized within router 400. Any of a wide variety of arbitration policies and units may be employed by router 400 which allow an inbound link to obtain access to an outbound link, which allow the inbound link to maintain access to the outbound link until the transfer of the packet is completed, and which resolve conflicts between multiple input links for access to the same output link.

The appropriate output link for a flit can be determined in a wide variety of manners. In one embodiment, channel selecting logic 420 stores the appropriate output link for each packet, as discussed above. In an alternate embodiment, channel selecting logic 420 asserts a signal to crossbar 416 each time it receives a new header block. This signal indicates to crossbar 416 the appropriate output link 411–414 for all flits coming from the appropriate inbound queue until a new signal is asserted. Alternatively, control logic within crossbar 416 may monitor the flits as they are transferred through the crossbar 416. Each time the control logic monitors a flit which is a header block indicating the next portion of the path for this router, the crossbar stores which output link all subsequent flits from that queue should be transferred to (until another appropriate header block is received).

If a flit received by router 400 is the first flit in a new packet, then router 400 does not transfer the flit to the appropriate output link 411,412, 413 or 414 until that appropriate output link is reserved. For example, a flit for a new packet may be received on input link 401 which is to be transferred to channel A of output link 412. However, another packet may have already been received on input link 403 which is currently transferring data to channel A of output link 412. Thus, router 400 waits until the packet being received on input link 403 is finished before transferring the packet from input link 401 to channel A of output link 412.

It should be noted that, under certain circumstances, flits received via input link 401 may fill the inbound queue for channel A before the packet being received on input link 403 is completely transferred to channel A of output link 412. When this occurs, router 400 asserts a signal to the router it is receiving the packet from on input link 401. This signal indicates to the prior router that the inbound queue is full and that transfer of flits to router 400 should be suspended until the signal is deasserted. Router 400 deasserts the signal once the channel A of output link 412 is available. It should further be noted that the suspension of transferring flits by the prior router may result in the inbound queue of the prior router being filled. In this situation, the prior router asserts a signal to the router it is receiving flits from to suspend transfer of flits until the signal is deasserted, analogous to the discussion above.

In the embodiment shown in FIG. 4, each output link 411–414 is associated with four outbound channels, each of which corresponds to an inbound channel of the input links 401–404. In one implementation of the present invention, crossbar 416 transfers one flit of data from an inbound channel to an outbound channel at a time. Each of the outbound channels comprises a 1-flit buffer which stores the flit until it is received by the next router. Alternatively, each of the outbound channels may comprise a multiple-flit FIFO buffer (for example, the same size buffer as each of the inbound queues 418a–418d). Thus, even though only a single flit is transferred from an inbound channel to an outbound channel by crossbar 416, the flits may be stored temporarily in the outbound channel and transferred over the output link to the next router as a multiple-flit unit.

In one embodiment of the present invention, router 400 includes an additional set of outbound channels which are coupled directly to the computing node connected to router 400. These outbound channels are used and arbitrated for analogous to the outbound channels coupled to output links 411–414, except that the channels transfer data directly to the computing node rather than to another routing device. Thus, when a new packet is received by one of the input links 401–404, the channel selecting logic determines whether this is the destination node for the packet and transfers the packet to the appropriate one of the outbound channels connected to the computing node.

In an alternate embodiment of the present invention, channel selecting logic 420 may be directly connected to the computing node. Thus, if the second flit is not a header block, then channel selecting logic 420 transfers the second and subsequent flits to the computing node connected to router 400. The channel selecting logic 420 continues to transfer the flits received from input link 401 to the computing node until the tail of the packet is received. Therefore, packets which are destined for the computing node coupled to router 400 are not transferred through crossbar 416 in this alternate embodiment.

Figure 5:
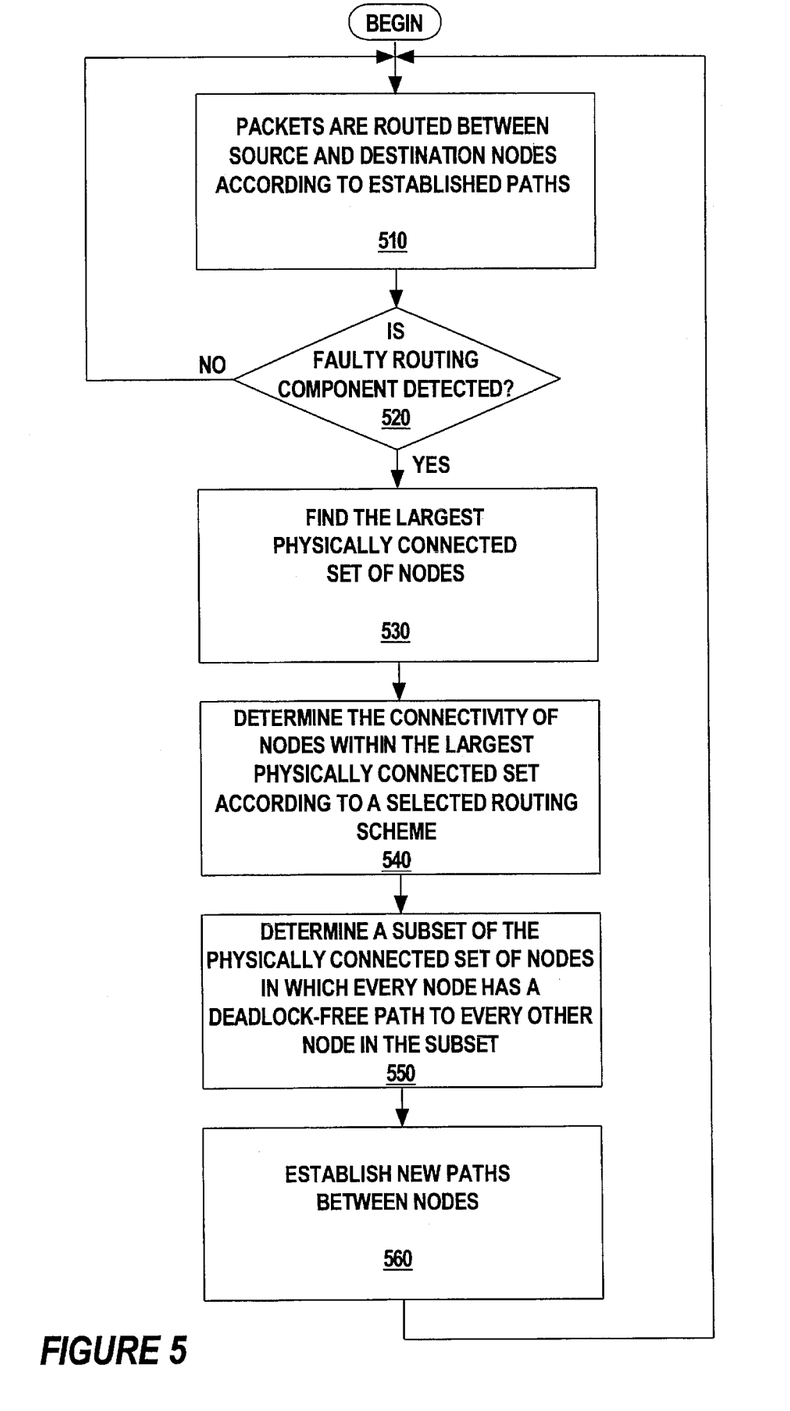
FIG. 5 is a flowchart showing the steps followed in the present invention in routing packets of data along paths through a network system.

FIG. 5 is a flowchart showing the steps followed in the present invention in determining paths for routing packets through a network system. Initially, packets of data are routed between the source and destination nodes according to established paths, step 510. Each node within the network contains a list of paths which enables the node to transfer data to other nodes in the network. In one embodiment of the present invention, each of these established paths is determined by each computing node in the network at system start-up according to steps 530–550 discussed below.

Each node within the network continually checks whether a faulty routing component in the system is detected, step

520. In one embodiment of the present invention, faulty routing components are detected by a central diagnostics unit. The central diagnostics unit is coupled to each router in the system and continuously monitors the behavior of the routing components within the system. When a faulty component is detected, the diagnostics unit broadcasts a signal to all nodes in the system indicating a faulty component has been detected. A faulty routing component can affect the transfer of data to a particular node by disabling one or all possible paths to that node.

A component may become faulty due to any of a wide variety of circumstances. For example, the control logic within a router may become faulty and not perform its task properly. Alternatively, other components which the router depends upon may become faulty, such as a power supply or one of the links between two routers. It should be noted that a faulty computing node is different from a faulty router. A computing node may become faulty, which means it is unavailable as a destination node. However, the router which is directly connected to that node may still be fully functional. Thus, the router can still be used by the network even though the computing node cannot.

In one implementation, the centralized diagnostics unit is coupled to each router in the system utilizing a serial bus which conforms to the IEEE JTAG standard. Each router includes multiple error bits and a single error pin coupled to the diagnostics unit. When a router discovers a possible error, the router sets the error bit(s) corresponding to the error discovered and asserts a signal via the error pin to the diagnostics unit. Which error bit(s) is set is dependent on the error discovered and may correspond to, for example, a parity error, low power, or an improper protocol (such as the first flit of a packet not being a header). Upon receipt of a signal from an error pin of a router, the diagnostics unit can access, via the serial bus, the error bits of the router to determine what error was detected. The diagnostics unit then determines whether the router is faulty. In one implementation, this determination is made based on the nature of the error (e.g., low power). Alternatively, the diagnostics unit may make this determination based on the frequency of error received (e.g., parity errors occurring too frequently). If the diagnostics unit determines the router is faulty, then the diagnostics unit broadcasts a signal to all nodes in the system indicating the identity of the failed router.

If no faulty router components are detected in step 520, then each node in the network continues to use its current established paths to route data throughout the network. However, when a faulty component is detected, each computing node in the system begins the process of determining a new set of paths to utilize in routing packets throughout the network.

The first step in generating a new set of paths is to find the largest physically connected set of nodes, step 530. Any two nodes are physically connected if a path(s) exists between them, in both directions, which does not involve any faulty components. For example, if a first path exists which can transfer data from node A to node B, but not from node B to node A, and a second path exists which can transfer data from node B to node A, but not from node A to node B, then nodes A and B are physically connected. However, if a path exists which can transfer data from node A to node B, but no path exists which can transfer data from node B to node A, then nodes A and B are not physically connected.

In one embodiment of the present invention, the largest set of physically connected nodes is determined utilizing a conventional depth-first search. That is, each node starts with itself and determines all other nodes which it is physically connected to. Once that set is determined, the node selects a node remaining within the network which is not part of that first set and determines all the nodes it is connected to. This process continues until all of the nodes are part of a set (note that a set is one or more nodes). Each node then determines which of these sets contains the largest number of nodes. In the event that two or more equally sized sets are the largest, then one of these sets is selected to be the "largest" set. In one implementation, this selection is made arbitrarily.

In one embodiment of the present invention, each node in the network knows the topology of the network. That is, each node contains information indicating which nodes are connected to which other nodes in the network and via which links and additional routers (if any) the nodes are connected. Thus, physical connection can be determined by each node if the central diagnostics unit sends out a message indicating which component(s) is faulty. Alternatively, physical connection of two nodes could be determined by a node sending a signal to another node and waiting for a response. If a response is not received within a predetermined period of time, then the two nodes are not physically connected.

It should be noted that a faulty router could result in all nodes still being physically connected. For example, a router may not have a computing node directly connected to it. If that router were to become faulty, then a physical path could still exist between all nodes in the network.

Once the largest set of physically connected nodes is determined, each node in that set determines the connectivity of the nodes within that set, step 540. In one embodiment of the present invention, each node within the network is associated with both a row and a column of a matrix. Referring to FIG. 1 A, the node coupled to the router at the top left of the matrix is associated with the first row and the first column, and the router at the bottom right is associated with the nth row and the nth column. This matrix is called the connectivity matrix and indicates the connectivity of the largest set of physically connected nodes. An example connectivity matrix C for a set with n nodes is shown below.

$$\begin{bmatrix} C_{1,1} & C_{1,2} & \ldots & C_{1,n} \\ C_{2,1} & C_{2,2} & \ldots & C_{2,n} \\ \cdot & \cdot & & \cdot \\ \cdot & \cdot & & \cdot \\ \cdot & \cdot & & \cdot \\ C_{n,1} & C_{n,2} & \ldots & C_{n,n} \end{bmatrix}$$

The connectivity matrix C is generated by determining, for each node in the largest set, whether a deadlock-free path exists between that node and every other node in the largest set. If a deadlock-free path exists from node x to node y, then $C_{x,y}$ is a one. However, if a deadlock-free path does not exist from node y to node x, then $C_{y,x}$ is a zero. Thus, each entry in the connectivity matrix C is either a one or a zero.

In one embodiment of the present invention, the connectivity matrix includes all nodes in the network. However, deadlock-free paths are only determined between the nodes in the largest set of physically connected nodes. Thus, the deadlock-free routing scheme(s) is able to properly determine routes through the system taking into account all routing components in the network, including those which are faulty, while only determining routes between the largest set of physically connected nodes.

In one embodiment of the present invention, a connectivity matrix C is generated for each virtual network within the set. Thus, by utilizing different deadlock-free routing schemes, a different connectivity matrix C could be generated for each virtual network. Each of these matrices is then combined to generate an aggregate connectivity matrix A. In the aggregate connectivity matrix A, if a deadlock-free path exists from node x to node y in any one or more of the multiple virtual networks, then $A_{x,y}$ is a one; otherwise $A_{x,y}$ is a zero.

When utilizing multiple virtual networks, each of the connectivity matrices C for each of the virtual networks is stored by the computing node. Thus, the computing node is able to reference these connectivity matrices at a later time in order to determine which virtual network provides a deadlock-free path to a particular destination node.

The deadlock-free routing scheme(s) utilized in step 540 can be any of a wide variety of conventional routing schemes. One such routing scheme is referred to as the "negative-first" scheme, indicated as $R_{--,++}$. Referring to the network of FIG. 1 A, in the negative-first scheme, routing from the source node to the destination node begins in the negative direction. The negative direction equates to a movement to the left or up in the network. For example, movement from router C to router B or router D is in the negative direction, and movement from router D to router C or router E is in the positive direction. Once movement begins in the positive direction it can continue in the positive direction, however movement in the negative direction cannot be resumed.

Other deadlock-free routing schemes may also be implemented by the present invention, such as the $R_{++,--}$, $R_{-+,+-}$, or $R_{+-,-+}$ schemes. In each of these deadlock-free routing schemes, generation of a path begins by moving in the xy direction indicated in the first subscript. Once movement begins in the xy direction indicated by the second subscript, then movement in the xy direction indicated by the first subscript is not resumed. For example, according to the $R_{-+,+-}$ routing scheme, path movement begins in the negative x positive y direction and can switch to the positive x negative y direction at any time, but does not switch back to the negative x positive y direction. It is well understood by those skilled in the art that by adhering to one such deadlock-free routing scheme for all nodes for a specific virtual network, a set of paths can be generated between each node which are guaranteed to be deadlock-free, assuming no faulty components are in the network.

By way of example, if routers D and H of FIG. 1A are faulty then a deadlock-free path exists from router F to router E according to the $R_{++,--}$ routing scheme. For example, router F to router B, router B to router G, and router G to router E. However, according to the $R_{--,++}$ routing scheme, a deadlock-free path does not exist from router F to router E.

The following deadlock-free routing schemes are utilized according to one embodiment of the present invention. If the system uses a single network (that is, no virtual networks), then the $R_{--,++}$ routing scheme is utilized. If the system uses two virtual networks, then the $R_{--,++}$ scheme is utilized for one network and the $R_{++,--}$ routing scheme is utilized for the second network. If the system uses four virtual networks, then the first, second, third and fourth networks utilize the $R_{--,++}$, $R_{++,--}$, $R_{-+,+-}$, $R_{+-,-+}$ routing schemes, respectively.

It will be appreciated that although the above routing schemes discuss a two-dimensional mesh network, similar deadlock-free routing schemes exist for n-dimensional mesh networks. For example, in a three-dimensional mesh network, utilizing a routing scheme of $R_{---,+++}$ ensures a set of deadlock-free paths. These deadlock-free routing schemes are well-known to those skilled in the art, and thus will not be discussed further.

Once the connectivity of the largest set of physically connected nodes is determined, a subset of the physically connected set of nodes is determined in which every node in the subset has a deadlock-free path to every other node in the subset, step 550. A deadlock-free path between each and every node is established when each entry in the connectivity matrix C is a one. This is discussed in more detail below with respect to FIG. 6. Thus, each node within this subset is able to transfer packets of data to and from every other node in the subset along a deadlock-free path. Each node within this subset then stores the paths to all other nodes in the subset which were generated in step 540. These new paths are then utilized by the node in transferring data to destination nodes within the network, step 560. Nodes within the network then continue transferring packets of data between each other, step 510, until another faulty routing component is detected.

It should be noted that, under certain circumstances, multiple deadlock-free paths may be generated from a source node to a destination node in step 540. These multiple paths may be in the same or different virtual networks. In one implementation, the source computing node maintains each of these paths and determines which path to utilize when a packet of data is transferred to the destination node. Alternatively, the computing node may select one of the paths to utilize and discard the remaining paths. The computing node may determine which of multiple paths to utilize in a wide variety of manners. In one embodiment, the computing node selects the shortest path. Alternatively, the computing node may select the path in the virtual network which is least-used by this computing node.

In an alternate embodiment of the present invention, steps 540 and 550 are repeated for each physically connected set of nodes rather than just the largest set. The resulting number of available nodes in the subsets from step 550 are then compared for each subset of nodes and the subset having the largest number of available nodes is made available to the user. Thus, this alternate embodiment verifies which set of physically connected nodes provides the largest number of available nodes, rather than presuming that the largest set of physically connected nodes provides the largest number of available nodes.

In one embodiment of the present invention, the network is a torus network. In a torus network, as described above, the routers on the ends of the network are coupled together, thus generating a layout analogous to a sphere. In one implementation, the method of FIG. 5 described above can be utilized in a torus network having twice as many virtual networks as a mesh network. That is, the present invention as described above using n virtual networks is applicable to a torus network utilizing 2.n virtual networks.

For example, the present invention applies to a torus network utilizing two virtual networks as shown below. Each router in the network is assigned a column and row position as shown below for the first virtual network.

$$\begin{bmatrix} R_{1,1} & R_{1,2} & \ldots & R_{1,n} \\ R_{2,1} & R_{2,2} & \ldots & R_{2,n} \\ \cdot & \cdot & & \cdot \\ \cdot & \cdot & & \cdot \\ \cdot & \cdot & & \cdot \\ R_{n,1} & R_{n,2} & \ldots & R_{n,n} \end{bmatrix}$$

When determining paths according to the deadlock-free routing scheme, the routers are treated as if they were setup in a mesh-based network as described above with respect to FIG. 1A. Thus, paths cannot flow over the boundaries of the matrix. For example, a path could not flow from the $R_{1,n}$ router to the $R_{1,1}$ router in the positive direction.

The column and row position assignments of the routers are then shifted for the second virtual network, as shown below.

$$\begin{bmatrix} \cdot & \cdot & \cdot & \cdot \\ \cdot & \cdot & \cdot & \cdot \\ \cdot & \cdot & \cdot & \cdot \\ \ldots R_{n-1,n-1} & R_{n-1,n} & R_{n-1,1} & R_{n-1,2} \ldots \\ \ldots R_{n,n-1} & R_{n,n} & R_{n,1} & R_{n,2} \ldots \\ \ldots R_{1,n-1} & R_{1,n} & R_{1,1} & R_{1,2} \ldots \\ \ldots R_{2,n-1} & R_{2,n} & R_{2,1} & R_{2,2} \ldots \\ \cdot & \cdot & \cdot & \cdot \\ \cdot & \cdot & \cdot & \cdot \\ \cdot & \cdot & \cdot & \cdot \end{bmatrix}$$

Analogous to the discussion above, paths cannot flow over the boundaries of the matrix. However, the boundaries are established along different router paths than the first virtual network. For example, a path from the $R_{2,1}$ router to the $R_{n,1}$ router in the positive direction is invalid in the second virtual network, but valid in the first virtual network. Similarly, a path from the $R_{2,1}$ router to the $R_{n,1}$ router in the negative direction is invalid in the first virtual network, but valid in the second virtual network. Thus, each of the two virtual networks represents a single mesh-based network, analogous to the discussion above. By utilizing these two layouts for the two virtual networks, each node in each virtual network is then associated with both a row and a column of a connectivity matrix, as discussed above. An aggregate connectivity matrix is then generated and new paths are generated as discussed above with reference to FIG. 5.

In step 550 of FIG. 5, a subset of the physically connected set of nodes is determined in which every node has a deadlock-free path to every other node in the subset. Ideally, this subset is the largest subset of the physically connected set of nodes in which every node has a deadlock-free path to every other node in the subset. Determining this largest subset, however, is an NP-complete (nondeterministic polynomial) problem; that is, the time necessary to solve the problem increases exponentially with the size of the problem (in this case, the size of the connectivity matrix). The solution to such a problem can be very time consuming; thus, one embodiment of the present invention, as described in more detail below with reference to FIG. 6, utilizes a heuristic algorithm that comes close to the ideal solution. The time for the heuristic algorithm increases as a polynomial function of the size of the problem rather than exponentially.

Figure 6:
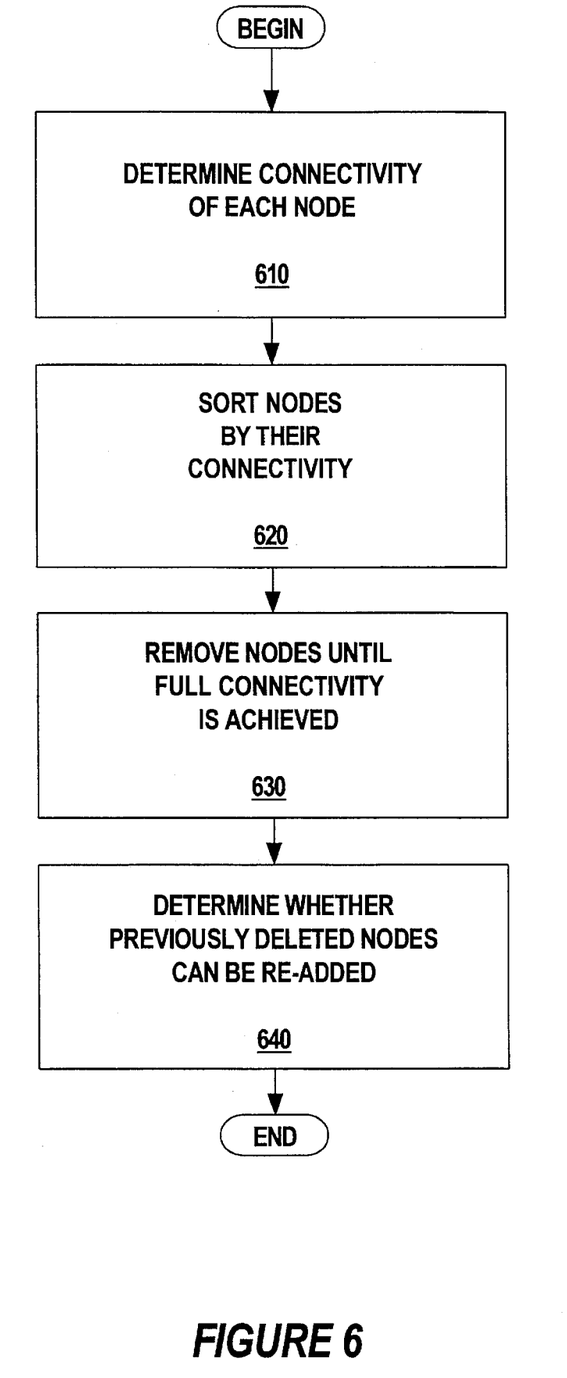
FIG. 6 shows the steps followed by one embodiment of the present invention in establishing a set of nodes which have a deadlock-free path between each other.

FIG. 6 shows the steps followed by one embodiment of the present invention in determining a subset of nodes which have a deadlock-free path between each other. FIG. 6 shows one implementation of step 550 of FIG. 5 in more detail. First, a connectivity value is generated for each node in the set of nodes, step 610. This connectivity value indicates the number of nodes within the set that a particular node has a deadlock-free path both to and from. In one implementation of the present invention, this connectivity value is generated on a row-by-row basis from matrix C. The connectivity for a node x starts at zero and is incremented by one each time $C_{x,y}$ and $C_{y,x}$ are both one. This is done for each of the n nodes in the matrix C, thereby generating a connectivity value for each of the nodes.

The nodes are then sorted according to their connectivity, step 620. Thus, a list of nodes is generated in order of increasing connectivity, so that nodes earliest in the list have the least connectivity.

Nodes are then removed from the set of nodes until full connectivity of the remaining nodes is achieved, step 630. Full connectivity refers to each node in the remaining set having a deadlock-free path to every other node in the remaining set (that is, each element in the connectivity matrix is a one). Nodes are removed from the set of nodes according to their connectivity. Thus, nodes earliest on the connectivity list, which are the nodes with the least connectivity, are removed from the set before other nodes are removed from the set. This process of removing nodes from the list is repeated until full connectivity is achieved (that is, until each node remaining in the set has a deadlock-free path to every other node in the set).

Once full connectivity is achieved, nodes which were removed from the set are attempted to be re-added to the set, step 640. It should be noted that step 640 is an optional optimization step. A node is re-added to the set if the set maintains full connectivity with the re-added node. In one implementation, nodes are attempted to be re-added in the reverse order of their removal in step 630 (that is, the first node to be removed is the last node to be attempted to be re-added). For example, the set of nodes determined in step 610 may comprise fifty computing nodes, eight of which are removed in step 630. However, the connectivity of these fifty nodes may be such that the third and fifth nodes to be removed in step 630 did not have full connectivity with the other nodes at the time they were removed only because they were not connected with the other six nodes which are removed in step 630. Therefore, the third and fifth nodes could be re-added to the remaining set of forty-two nodes and full connectivity could still be achieved.

Thus, the present invention enhances the fault-tolerance of a network system. When a faulty component(s) is detected in the network, the system determines a set of nodes which are physically connected together, taking into account the faulty component(s). A subset of this set of nodes is then generated to ensure that each node within that subset has a deadlock-free path between every other node in the subset. Then, this subset of nodes becomes the new set of computing nodes which make up the network. The system performs these steps automatically in a manner which is transparent to the system user(s). Thus, even though components may break down while the network is operating, the network corrects the problems automatically without user intervention.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims, which in themselves recite only those features regarded as essential to the invention.

Thus, a method and apparatus for enhancing the fault-tolerance of a network has been described.

What is claimed is:

1. A method for finding a set of available computing nodes in a network upon detection of a faulty network component, the method comprising the steps of:

(a) determining a set of nodes in the network which are physically coupled together;

(b) for a first node of the set of nodes determining a connectivity value which indicates a number of nodes of the set of nodes to which the first node has a deadlock-free path;

(c) repeating the determining step (b) for each node of the set of nodes;

(d) determining a subset of the set of nodes such that each node in the subset can transfer data to and from each other node in the subset, wherein the determining of the subset is based on the connectivity value for each node of the set of nodes; and (e) using the subset of the set of nodes as the set of available computing nodes.

2. The method of claim 1, wherein the determining step (a) comprises determining a largest set of nodes in the network which are physically coupled together, excluding the faulty network component.

3. The method of claim 1, wherein the network supports a plurality of virtual networks, and wherein the determining step (b) comprises determining the connectivity value using the plurality of virtual networks.

4. The method of claim 3, wherein the determining step (d) comprises a step of checking whether a deadlock-free path exists between each node in the subset using a different deadlock-free routing scheme for each of the plurality of virtual networks.

5. The method of claim 1, wherein the determining step (d) comprises a step of checking whether a deadlock-free path exists between each node in the subset.

6. The method of claim 1, wherein the determining step (d) comprises a step of removing nodes from the set of nodes until a deadlock-free path exists between each node remaining in the subset of nodes.

7. The method of claim 6, wherein the determining step (d) further comprises removing a second node prior to removing a third node, wherein the second node has a lower connectivity value than the third node.

8. The method of claim 6, wherein the determining step (d) further comprises adding a second node to the subset of nodes, wherein the second node is one of the set of nodes, and wherein the second node was previously removed from the subset of nodes.

9. An apparatus in a network comprising:

a memory unit;

a network interface unit coupled to the memory unit; and a processing unit coupled to the memory unit and the network interface unit which, upon discovery of a faulty network component, determines a set of nodes in the network which the apparatus is physically coupled to and determines a number of nodes of the set of nodes to which the apparatus has a deadlock-free path, wherein the processing unit also determines a subset of the set of nodes such that each node in the subset can transfer data to and from each other node in the subset, and wherein the processing unit uses the subset of the set of nodes as a set of available network nodes.

10. The apparatus of claim 9, wherein the processing unit also determines, for each node of the set of nodes, a number of nodes of the set of nodes to which each node has a deadlock-free path.

11. The apparatus of claim 9, wherein the network supports a plurality of virtual networks and wherein the processing unit determines the number of nodes to which the apparatus has a deadlock-free path using the plurality of virtual networks.

12. The apparatus of claim 9, wherein the processing unit selects the deadlock-free path between the apparatus and each node of the subset of nodes and stores the path in the memory unit.

13. The apparatus of claim 9, wherein the apparatus is one of the set of nodes.

14. A network system comprising:

a plurality of routing devices;

a plurality of communication links coupled to the plurality of routing devices; and a plurality of computing nodes coupled to the plurality of routing devices, wherein each node of the plurality of computing nodes determines, upon discovery of a faulty network component, a set of nodes in the network system which are physically coupled together and determines a number of nodes of the set of nodes to which each node has a deadlock-free path, wherein each of the plurality of computing nodes also determines a subset of the set of nodes such that each node in the subset can transfer data to and from each other node in the subset, and wherein each node of the subset of nodes uses the subset of the set of nodes as a set of available nodes.

15. The system of claim 14, wherein the plurality of routing devices are coupled together in a two-dimensional mesh network configuration.

16. The system of claim 14, wherein each of the plurality of computing nodes is connected to one routing device of the plurality of routing devices.

17. The system of claim 14, wherein each routing device of the plurality of routing devices comprises a plurality of input queues for each of the plurality of communication links input to each routing device.

18. The system of claim 14, wherein each of the plurality of routing devices supports a plurality of virtual networks.

19. An apparatus for finding a set of available nodes in a network upon detection of a faulty network component comprising:

means for determining a largest set of nodes in the network which are physically coupled together;

for each node of the largest set of nodes, means for determining a connectivity value which indicates a number of nodes of the largest set of nodes to which a particular node has a deadlock-free path;

means for determining a subset of the largest set of nodes such that each node in the subset can transfer data to and from each other node in the subset, wherein the means for determining a subset determines the subset based on the connectivity value for each node of the largest set of nodes; and means for using the subset of the largest set of nodes as the set of available nodes.

20. The apparatus of claim 19, wherein the network supports a plurality of virtual networks, and wherein the means for determining the connectivity value determines the connectivity value using the plurality of virtual networks.

21. The apparatus of claim 20, wherein the means for determining a subset checks whether a deadlock-free path exists between each node in the subset using a different deadlock-free routing scheme for each of the plurality of virtual networks.

22. The apparatus of claim 19, wherein the means for determining a subset removes nodes from the largest set of nodes until a deadlock-free path exists between each node remaining in the subset of nodes.

23. The apparatus of claim 22, wherein the means for determining a subset also removes a first node prior to removing a second node, wherein the first node has a lower connectivity value than the second node.

24. The apparatus of claim 22, wherein the means for determining a subset also adds a first node to the subset of nodes, wherein the first node is one of the largest set of nodes, and wherein the first node was previously removed from the subset of nodes.

* * * * *